United States Patent
Linde et al.

(10) Patent No.: US 11,220,349 B2
(45) Date of Patent: Jan. 11, 2022

(54) POWER SUPPLY UNIT AND ON-BOARD POWER SUPPLY NETWORK OF AN AIRCRAFT OR SPACECRAFT

(71) Applicant: Airbus Operations GmbH, Hamburg (DE)

(72) Inventors: Peter Linde, Hamburg (DE); Sean Dempsey, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/903,827

(22) Filed: Jun. 17, 2020

(65) Prior Publication Data
US 2020/0407074 A1    Dec. 31, 2020

(30) Foreign Application Priority Data

Jun. 26, 2019  (DE) ..................... 10 2019 209 236.5

(51) Int. Cl.
*B64D 41/00* (2006.01)
*H02J 5/00* (2016.01)

(52) U.S. Cl.
CPC ............... *B64D 41/00* (2013.01); *H02J 5/00* (2013.01); *B64D 2221/00* (2013.01); *H02J 2310/44* (2020.01)

(58) Field of Classification Search
CPC ....... B64D 41/00; B64D 2221/00; H02J 5/00; H02J 2310/44; Y02T 50/40
See application file for complete search history.

(56) References Cited

U.S. PATENT DOCUMENTS

| 2008/0174177 A1 | 7/2008 | Langlois et al. | |
|---|---|---|---|
| 2009/0104493 A1 | 4/2009 | Metzler et al. | |
| 2009/0134851 A1* | 5/2009 | Takeda | H02M 3/07 323/234 |
| 2014/0175907 A1* | 6/2014 | Takahashi | H02J 50/05 307/149 |
| 2014/0183995 A1* | 7/2014 | Saitou | F04B 39/121 310/72 |

(Continued)

FOREIGN PATENT DOCUMENTS

| DE | 10332791 A1 | 2/2005 |
|---|---|---|
| DE | 102007017820 A1 | 8/2008 |

(Continued)

OTHER PUBLICATIONS

Qian, Hui, et al. "Multifunctional structural supercapacitor composites based on carbon aerogel modified high performance carbon fiber fabric." ACS applied materials & interfaces 5.13 (2013): 6113-6122. (Year: 2013).*

(Continued)

*Primary Examiner* — Daniel Cavallari
(74) *Attorney, Agent, or Firm* — Lerner, David, Littenberg, Krumholz & Mentlik, LLP

(57) ABSTRACT

A power supply unit includes a housing having at least one input terminal and at least one output terminal, an AC-DC converter which is arranged in the housing and which is connected to the input terminal, a DC-DC converter which is arranged in the housing and which is connected to the output terminal; and a capacitor which forms a structural part of the housing. Furthermore, an on-board power supply network of an aircraft or spacecraft is also described.

14 Claims, 3 Drawing Sheets

(56) References Cited

U.S. PATENT DOCUMENTS

2015/0249362 A1    9/2015  Bridgelall et al.
2016/0079793 A1*   3/2016  Cho ..................... H02J 7/0042
                                                        320/108

FOREIGN PATENT DOCUMENTS

DE    102017208794 A1    11/2018
JP      2013236442 A  *  11/2013

OTHER PUBLICATIONS

German Search Report for Application No. DE 10 2019 209 236.5 dated Mar. 30, 2020, 2 pages.

* cited by examiner

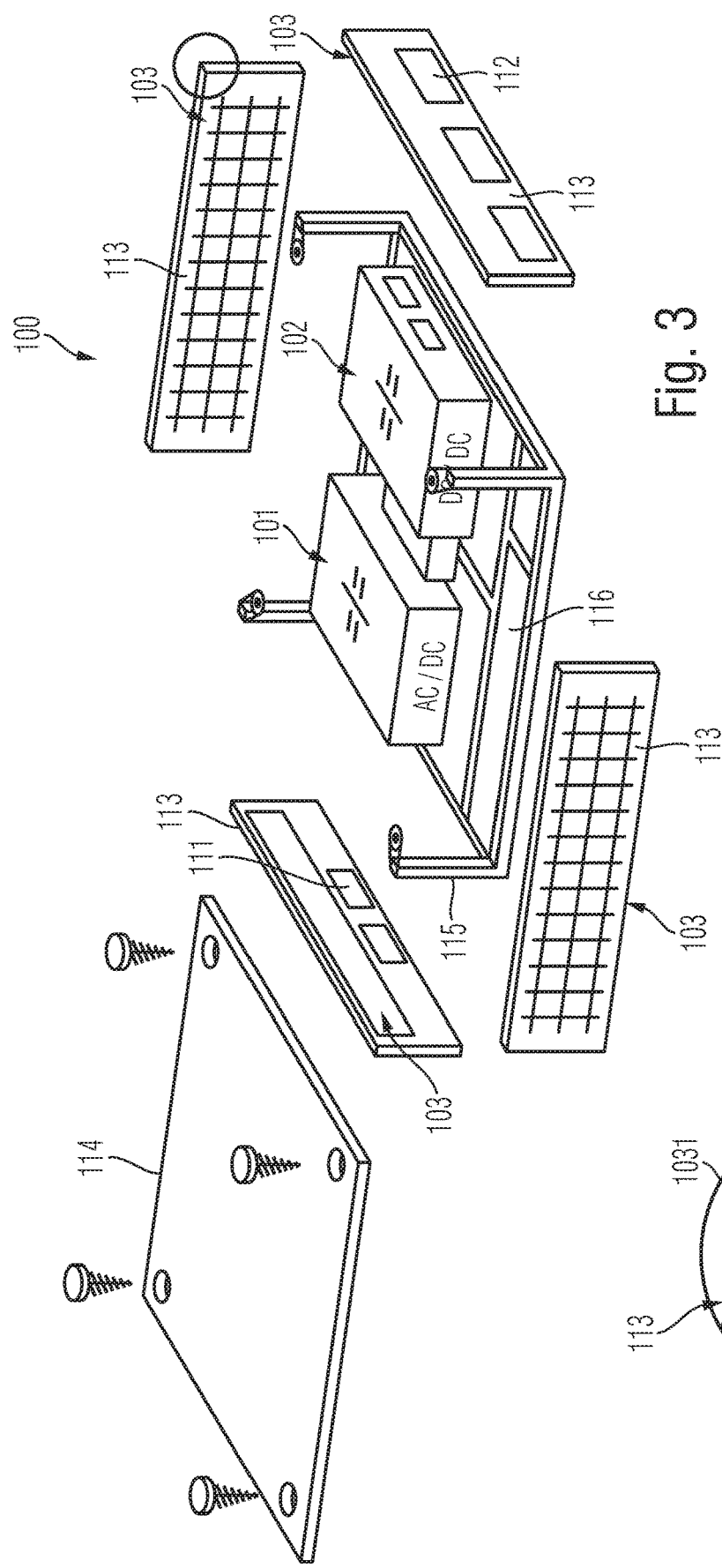

POWER SUPPLY UNIT AND ON-BOARD POWER SUPPLY NETWORK OF AN AIRCRAFT OR SPACECRAFT

FIELD OF THE INVENTION

The present invention relates to a power supply unit and an on-board power supply network of an aircraft or spacecraft.

BACKGROUND OF THE INVENTION

In on-board power supply networks of commercial aircraft, various power cables are used. There are, for example, combinations made up of 28 VDC cables and 115 VAC cables. A 115 VAC system requires, for example, an AC-DC converter and then a DC-DC converter in order to provide electrical loads with, for example, 12 VDC. A 28 VDC system requires a DC-DC converter in order to supply electrical loads, for example, with 12 VDC.

AC systems generally have more unused power and, in addition, also have higher efficiency of required weight in relation to provided power. In this respect, in aerospace engineering, it would be desirable to cover the entire power requirement only with the most efficient networks which would be technically feasible. However, for this purpose, converters are required in the distribution system, or power supply units are required in the electrical load, which must be connected between the AC on-board power supply network and the electrical loads which require direct current.

Such power supply units require space and sometimes have a high weight, inter alia, because it would also be desirable to provide such power supply units with an energy storage function in order to ensure the supply of electric power to the electrical loads even if the on-board power supply network briefly fails.

BRIEF SUMMARY OF THE INVENTION

Against this background, an aspect of the present invention may reduce the size and weight of a power supply unit which is suitable for an on-board power supply network of an aircraft or spacecraft.

Accordingly, an embodiment of a power supply unit is provided. The power supply unit comprises a housing having at least one input terminal and at least one output terminal, an AC-DC converter which is arranged in the housing and which is connected to the at least one input terminal, a DC-DC converter which is arranged in the housing and which is connected to the at least one output terminal, and a capacitor which forms a structural part of the housing.

In addition, an on-board power supply network of an aircraft or spacecraft is provided. The on-board power supply network comprises an AC network, a power supply unit according to the present invention, wherein the at least one input terminal of the power supply unit is connected to the AC network, and at least one DC electrical load which is connected to the at least one output terminal of the power supply unit.

An idea underlying the present invention is to combine the housing required for a power supply unit with the functions of a capacitor for supplying electrical energy. As a result, it is possible to achieve large reductions in size and weight for the power supply unit, which is particularly advantageous in aerospace engineering.

Advantageous embodiments and refinements result from the description with reference to the figures.

According to one embodiment, the capacitor may be configured in the form of a supercapacitor. Supercapacitors are electrochemical capacitors and are made up of two electrodes which are mechanically separated from one another by an electrically conducting separator, but which are connected to one another by means of an electrolyte. Due to their extremely high power density, superconductors are particularly suitable for use in aerospace engineering.

According to one embodiment, the supercapacitor may comprise a laminate made of fiber-reinforced plastic. This constitutes an advantageously weight- and space-saving embodiment of a supercapacitor.

According to one embodiment, the supercapacitor may comprise a separator layer, in particular made of fiberglass-reinforced plastic, two electrode layers enclosing the separator layer, in particular made of carbon fiber-reinforced plastic impregnated with carbon aerogel, two collecting layers enclosing the electrode layers, in particular made of graphene, and two protective layers enclosing the collecting layers, in particular made of thermoplast. This constitutes an advantageously easy-to-produce embodiment of a supercapacitor having advantageously high mechanical stability, which is why such a supercapacitor is particularly suitable for the structural formation of a housing.

According to another embodiment, the housing may comprise at least one outer wall, and the capacitor may form at least one structural part of the at least one outer wall, in particular the entire at least one outer wall. As a result, the proportion of the supercapacitor on the housing, and the electrical energy to be stored, may be advantageously maximized.

According to one embodiment, the at least one outer wall is formed as a replaceable outer wall. This enables the advantageous replacement of individual integral parts of the housing, in particular of the capacitor, for repair and maintenance.

According to another embodiment, the capacitor may be electrically switched between the AC-DC converter and the DC-DC converter. As a result, it may be advantageously ensured that even in the case of a malfunction, it continues to be possible to provide electrical energy to the at least one output terminal.

According to another embodiment, the capacitor may be configured to be connected to an external power network. This ensures the advantageous supply of further electrical loads with electrical energy.

According to one embodiment of the on-board power supply network, said network may further comprise an emergency network, wherein the emergency network is connected to the capacitor of the power supply unit. As a result, possible emergency conductors may be omitted in an advantageous manner, since even in the case of a malfunction, the supply of safety-critical systems with electrical energy can be ensured by the capacitor.

The embodiments and refinements mentioned above may be combined in any arbitrary manner, as appropriate. Further possible embodiments, refinements, and implementations of the present invention also include combinations, which are not explicitly mentioned, of features of the present invention which have been previously described or which are described below with respect to the exemplary embodiments. In particular, those skilled in the art will also add individual aspects as improvements or refinements to the respective basic form of the present invention.

BRIEF DESCRIPTION OF THE DRAWINGS

The present invention will be described in greater detail below, based on the exemplary embodiments specified in the schematic figures. The following are shown:

FIG. 3 depicts a schematic exploded view of the power supply unit from FIG. 2;

FIG. 4 depicts a detailed schematic view of a portion of the power supply unit depicted in FIG. 3.

DETAILED DESCRIPTION

Figure 1:
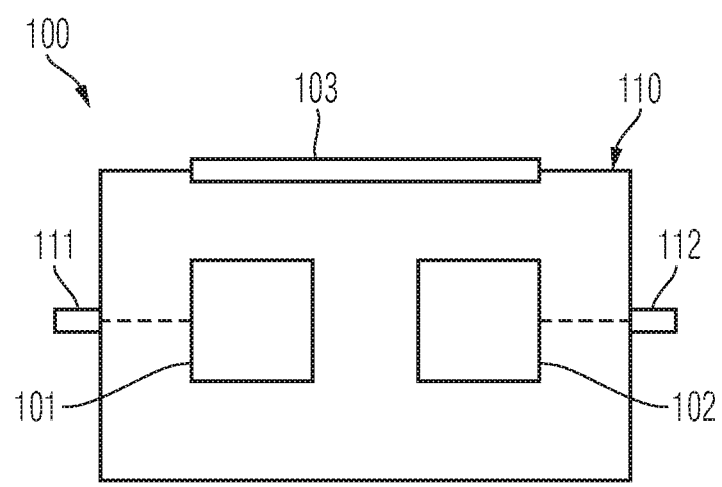
FIG. 1 depicts a schematic representation of one embodiment of a power supply unit.

The attached figures are intended to convey additional understanding of the embodiments of the present invention. They illustrate embodiments and are used in conjunction with the description for explaining principles and concepts of the present invention. Other embodiments and many of the aforementioned advantages result with respect to the drawings. The elements of the drawings are not necessarily true to scale with respect to one other.

In the figures of the drawing, identical, functionally identical and identically acting elements, features and components are respectively provided with the same reference characters, unless stated otherwise.

FIG. 1 depicts a schematic representation of a power supply unit 100. The power supply unit comprises a housing 110 which has an input terminal 111 and an output terminal 112. An AC-DC converter 101 and a DC-DC converter 102 are arranged inside the housing. The AC-DC converter 101 is connected to the input terminal 111. The DC-DC converter 102 is connected to the output terminal 112. In addition, the power supply unit comprises a capacitor 103 which forms a structural part of the housing 110.

Figure 2:
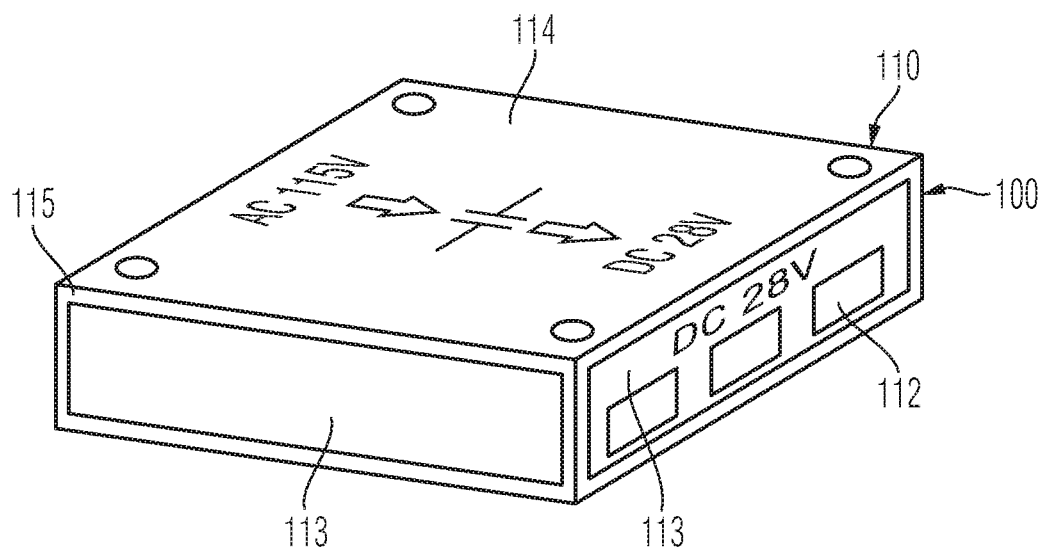
FIG. 2 depicts a schematic oblique view of one embodiment of a power supply unit.

FIG. 2 depicts a schematic oblique view of a power supply unit 100. The power supply unit comprises a housing 110 which has four replaceable outer walls 113 in the form of side walls, and a top 114, which are connected to a frame 115. One of the replaceable outer walls 113 has a total of three output terminals 112.

FIG. 3 depicts a schematic exploded view of the power supply unit depicted in FIG. 2. In this view, it is apparent that the top 114 of the housing 110 is attached to the frame 115 by means of screws. If the top 114 is detached from the frame 115, the replaceable outer walls 113 can be removed from the frame 115. The frame 115 furthermore encloses a bottom 116 of the housing. One of the replaceable outer walls 113 furthermore has two input terminals 111.

FIG. 3 shows the AC-DC converter 101 and the DC-DC converter 102, which are arranged inside the housing 110 in such a way that in the closed state, the AC-DC converter 101 is connected to the two input terminals 111 and the DC-DC converter 102 is connected to two of the three output terminals 112.

In the exemplary embodiment depicted in FIG. 3, the replaceable outer walls 113 are respectively formed at least partially by supercapacitors. This is discussed in greater detail below in FIG. 4. FIG. 3 shows that the replaceable outer walls 113 are connected to one another and to the AC-DC converter 101 and the DC-DC converter 102 by means of conductors running on the bottom 116 of the housing. The replaceable outer walls 113, or rather the supercapacitors, thereby function as a capacitor 103 within the scope of the present invention. The capacitor 103 is also connected to the third output terminal 112 via one of the conductors.

FIG. 4 shows a schematic detailed view of the corner of one of the replaceable outer walls 113 encircled in FIG. 3. The replaceable side wall 113 is configured in the form of a fiber-composite laminate which forms a supercapacitor according to the following pattern.

The replaceable side wall 113 has a central layer made of fiberglass-reinforced plastic which acts as a separator layer 1034 of the supercapacitor. Layers made of carbon-fiber-reinforced plastic are respectively arranged on both sides of the separator layer 1034, and are impregnated with a carbon aerogel and thereby act as electrode layers 1033 of the supercapacitor. Graphene layers are respectively arranged on the outer sides of the electrode layers 1033, which act as collecting layers 1032 of the supercapacitor. Protective layers 1031 made of a thermoplast are arranged on the outer sides of the collecting layers 1032.

In this way, the replaceable side wall 113 unifies a combination made up of a structural component of the housing 110 and a capacitor 103 of the power supply unit 100. As a result, the size and weight of the power supply unit 100 can be reduced in a highly advantageous manner.

Figure 5:
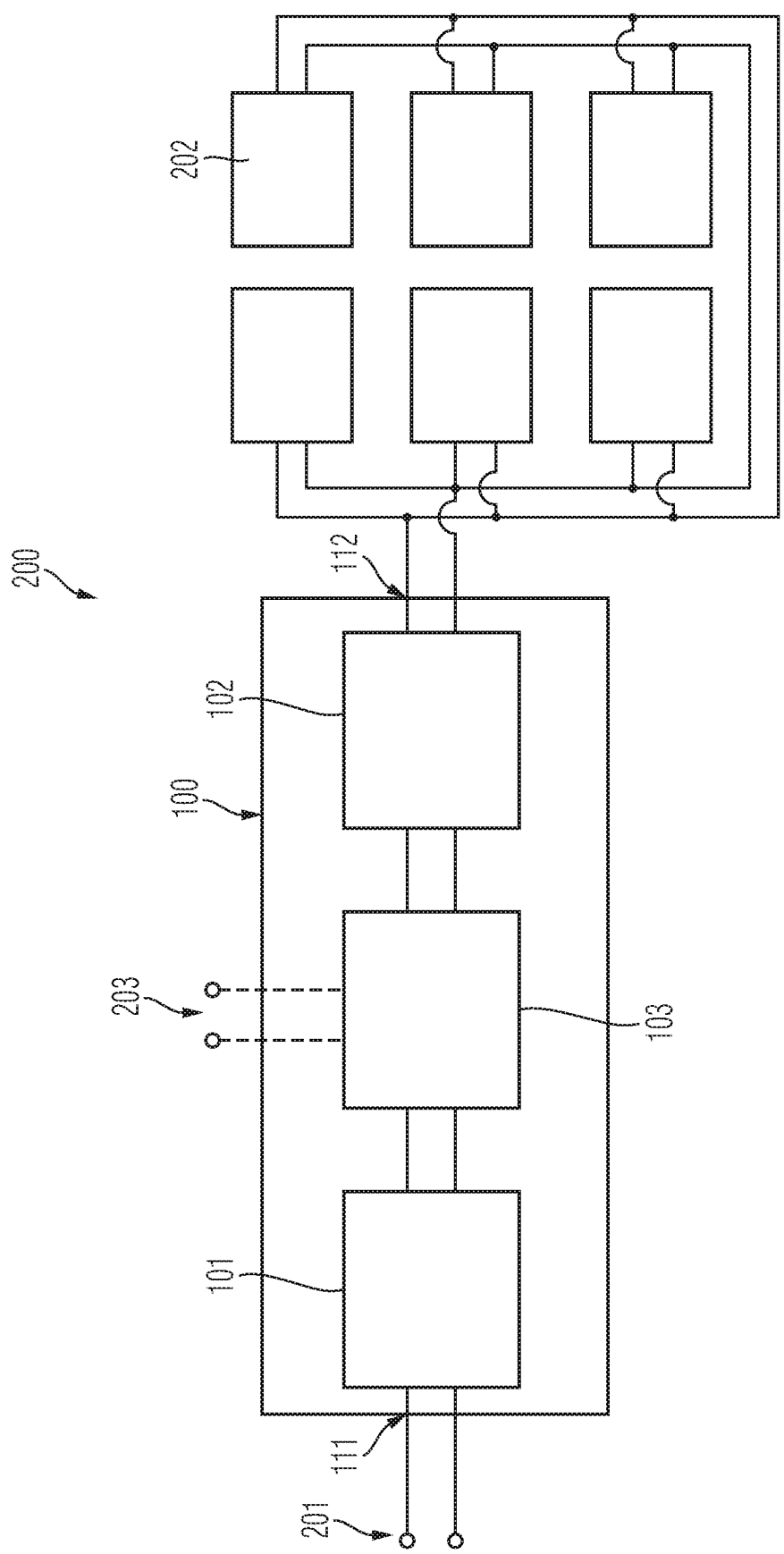
FIG. 5 depicts a schematic circuit diagram of one embodiment of an on-board power supply network.

FIG. 5 shows a schematic circuit diagram of an on-board power supply network 200 of an aircraft or spacecraft. The on-board power supply network 200 comprises an AC network 201. This AC network 201 is connected to the input terminal 111 of a power supply unit 100. An AC-DC converter 101 of the power supply unit is connected to the input terminal 111 and to a capacitor 103 of the power supply unit 100. The capacitor 103 is in turn connected to a DC-DC converter 102 of the power supply unit 100, which in turn is connected to an output terminal 112 of the power supply unit. A total of six DC electrical loads 202 are connected to the output terminal 112 of the power supply unit 100.

The AC-DC converter 101 converts the AC voltage of the AC network 201 into DC voltage via which the capacitor 103 is charged. The DC-DC converter 102 thereupon converts the voltage present at the capacitor 103 in such a way that the DC electrical loads 202 can be supplied with electricity.

By means of this arrangement, the DC electrical loads 202 can continue to be supplied with electricity even in the case of a failure of the AC network 201, at least for a certain period.

FIG. 5 furthermore depicts an optional connection of the capacitor 103 to an emergency network 203 of the on-board power supply network 200. Such a connection allows the safety-critical functions which are attached to the emergency network 203 to be connected to the normal AC network 201 of the on-board power supply network 200. Previously, such a connection was more likely avoided, since in the case of emergency, the normal AC network 201 of an aircraft or spacecraft could be switched off. In such a case, the circuit depicted in FIG. 5 enables an additional function of the safety-critical components, since they would continue to be supplied with electricity via the capacitor 103 of the power supply unit 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS

100 Power supply unit
101 AC-DC converter
102 DC-DC converter
103 Capacitor
110 Housing
111 Input terminal
112 Output terminal
113 Outer wall
114 Top
115 Frame
116 Bottom
200 On-board power supply network
201 AC network
202 DC electrical load
203 Emergency network

The invention claimed is:

1. A power supply unit comprising:
   a housing having at least one input terminal and at least one output terminal;
   an AC-DC converter arranged in the housing and connected to the input terminal; and
   a DC-DC converter arranged in the housing and connected to the output terminal,
   wherein a structural part of the housing is configured to form a capacitor and as a part of housing for covering the AC-DC converter and the DC-DC converter.

2. The power supply unit as claimed in claim 1, wherein the capacitor is configured in the form of a supercapacitor.

3. The power supply unit as claimed in claim 2, wherein the supercapacitor has a laminate made of fiber-reinforced plastic.

4. The power supply unit as claimed in claim 3, wherein the supercapacitor comprises a separator layer, two electrode layers comprising the separator layer, two collecting layers comprising the electrode layers, and two protective layers comprising the collecting layers.

5. The power supply as claimed in claim 4, wherein the separator layer is made of fiberglass reinforced plastic.

6. The power supply as claimed in claim 4, wherein the two electrode layers are made of carbon fiber reinforced plastic impregnated with carbon aerogel.

7. The power supply as claimed in claim 4, wherein the two collecting layers are made of graphene.

8. The power supply as claimed in claim 4, wherein the two protective layers are made of thermoplast.

9. The power supply unit as claimed in claim 1, wherein the housing has at least one outer wall, and the capacitor forms at least one structural part of the at least one outer wall.

10. The power supply unit as claimed in claim 9, wherein the at least one outer wall is configured as a replaceable outer wall.

11. The power supply unit as claimed in claim 1, wherein the capacitor is electrically connected between the AC-DC converter and the DC-DC converter.

12. The power supply unit as claimed in claim 1, wherein the capacitor is configured to be connected to an external power network.

13. An on-board power supply network of an aircraft or spacecraft, comprising:
    an AC network;
    a power supply unit as claimed in claim 1, wherein the at least one input of the power supply unit is connected to the AC network; and
    at least one DC electrical load connected to the at least one output terminal of the power supply unit.

14. The on-board power supply network as claimed in claim 13 wherein the capacitor is configured to be connected to an external power network, and
    wherein the system further comprises an emergency network, wherein the emergency network is connected to the capacitor of the power supply unit.

* * * * *